(12) United States Patent
Dodds et al.

(10) Patent No.: US 7,946,494 B2
(45) Date of Patent: May 24, 2011

(54) LASER SCANNING UNIT HOUSING

(75) Inventors: Dana Allen Dodds, Georgetown, KY (US); Danny Peters, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1278 days.

(21) Appl. No.: 11/465,868

(22) Filed: Aug. 21, 2006

(65) Prior Publication Data

US 2008/0043338 A1    Feb. 21, 2008

(51) Int. Cl.
*G06K 7/10* (2006.01)
(52) U.S. Cl. .................. 235/462.43; 235/462.4
(58) Field of Classification Search ............. 235/462.45, 235/462.4, 462.43
See application file for complete search history.

(56) References Cited

U.S. PATENT DOCUMENTS

| 3,773,338 | A | 11/1973 | Fidler et al. |
| 5,953,042 | A | 9/1999 | Nabeta et al. |
| 6,578,765 | B2 * | 6/2003 | Huss et al. ................. 235/454 |
| 2005/0211781 | A1 | 9/2005 | Cannon et al. |

OTHER PUBLICATIONS

C. Kirkland, Magazine article from IMM Magazine Article Archive entitled Microcellular foaming reduces cycles, costs, and quotes, 2 pgs.

* cited by examiner

*Primary Examiner* — Karl D. Frech

(57) ABSTRACT

A cover is adapted to form part of a housing of a laser scanning unit. The cover comprises a main body having walls for defining at least one opening adjacent a lens located in a base of a laser scanning unit housing. At least one of the walls comprising seal structure formed integral with an adjacent portion of the one wall. The seal structure is adapted to engage a side portion of the lens so as to seal a gap between the lens side portion and the one wall.

16 Claims, 6 Drawing Sheets

FIG.2A

LASER SCANNING UNIT HOUSING

TECHNICAL FIELD AND INDUSTRIAL APPLICABILITY OF THE INVENTION

The present invention relates generally to a laser scanning unit housing and, more particularly, to such a housing having a cover with at least one integrated lens seal structure.

BACKGROUND OF THE INVENTION

Laser scanning units are known comprising a laser diode for generating a laser beam, a rotating polygonal mirror for reflecting the laser beam along a scan line on a photoconductive (PC) drum, and post-scan optics comprising at least one fΘ lens and at least one stationary mirror positioned between the rotating mirror and the PC drum. To prevent dust and like contamination from reaching the rotating polygonal mirror within a housing of a laser scanning unit, the housing is typically sealed to prevent air from passing into the housing. U.S. Pat. No. 5,953,042 discloses structure to seal a space between a housing cover and a lens. It is also known to use V-shaped polyester film strips to seal gaps between a lens and a cover of a laser scanning unit housing. The cover includes walls defining a lens-receiving opening. The film strips extend along longitudinal side portions of the lens and longitudinal walls of the cover defining a portion of the lens-receiving opening. The polyester film strips are die cut into rectangular blanks, formed into a V-shape and adhesively secured to the longitudinal cover walls. An edge of each strip opposite an edge adhesively secured to a cover wall engages a corresponding side portion of the lens. The strip edge is maintained in position against the lens side portion by a spring force, inherent within the V-shaped strip, acting on the strip edge contacting the lens.

SUMMARY OF THE INVENTION

In accordance with a first aspect of the present invention, a cover is adapted to form part of a housing of a laser scanning unit. The cover comprises a main body having walls for defining at least one opening adjacent a lens located in a base of a laser scanning unit housing. At least one of the walls comprises seal structure formed integral with an adjacent portion of the one wall. The seal structure is adapted to engage a side portion of the lens so as to seal a gap between the lens side portion and the one wall.

The adjacent structure of the one wall may comprise a support member and the seal structure may comprise a flexible arm extending from the support member. The flexible arm may extend from the support member at an angle of from about 95 degrees to about 175 degrees. The flexible arm may have a thickness of from about 0.1 mm to about 1 mm. The support member may have a thickness of from about 1 mm to about 3 mm.

The at least one main body wall may comprise at least one longitudinal wall and the seal structure may comprise longitudinal seal structure adapted to engage a longitudinal side portion of the lens.

The at least one main body wall may comprise first and second longitudinal main body walls. The first wall may define first seal structure adapted to engage a first longitudinal side portion of the lens and the second wall may define second seal structure adapted to engage a second longitudinal side portion of the lens.

The main body walls may define first and second openings. The first opening may be adapted to receive a first lens and may be defined in part by a first wall. The second opening may be adapted to receive a second lens and may be defined in part by a second wall. The first wall may comprise first seal structure formed integral with an adjacent portion of the first wall and may be adapted to engage a side portion of the first lens so as to seal a gap between the first lens side portion and the first wall. The second wall may comprise second seal structure formed integral with an adjacent portion of the second wall and may be adapted to engage a side portion of the second lens so as to seal a gap between the second lens side portion and the second wall.

The main body may be formed from a microcellular foam.

In accordance with a second aspect of the present invention, a housing is provided for a laser scanning unit. The housing comprises a base and a cover. The cover is adapted to be secured to the base. The cover may comprise a main body having walls for defining at least one opening adjacent to a lens located in the base. At least one of the walls may comprise seal structure formed integral with an adjacent portion of the one wall. The seal structure may be adapted to engage a side portion of the lens so as to seal a gap between the lens side portion and the one wall.

BRIEF DESCRIPTION OF THE DRAWINGS

FIG. 2A is a perspective view of the polygonal mirror, the first and second pre-scan assemblies and the post-scan optical assembly with the printhead housing removed;

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
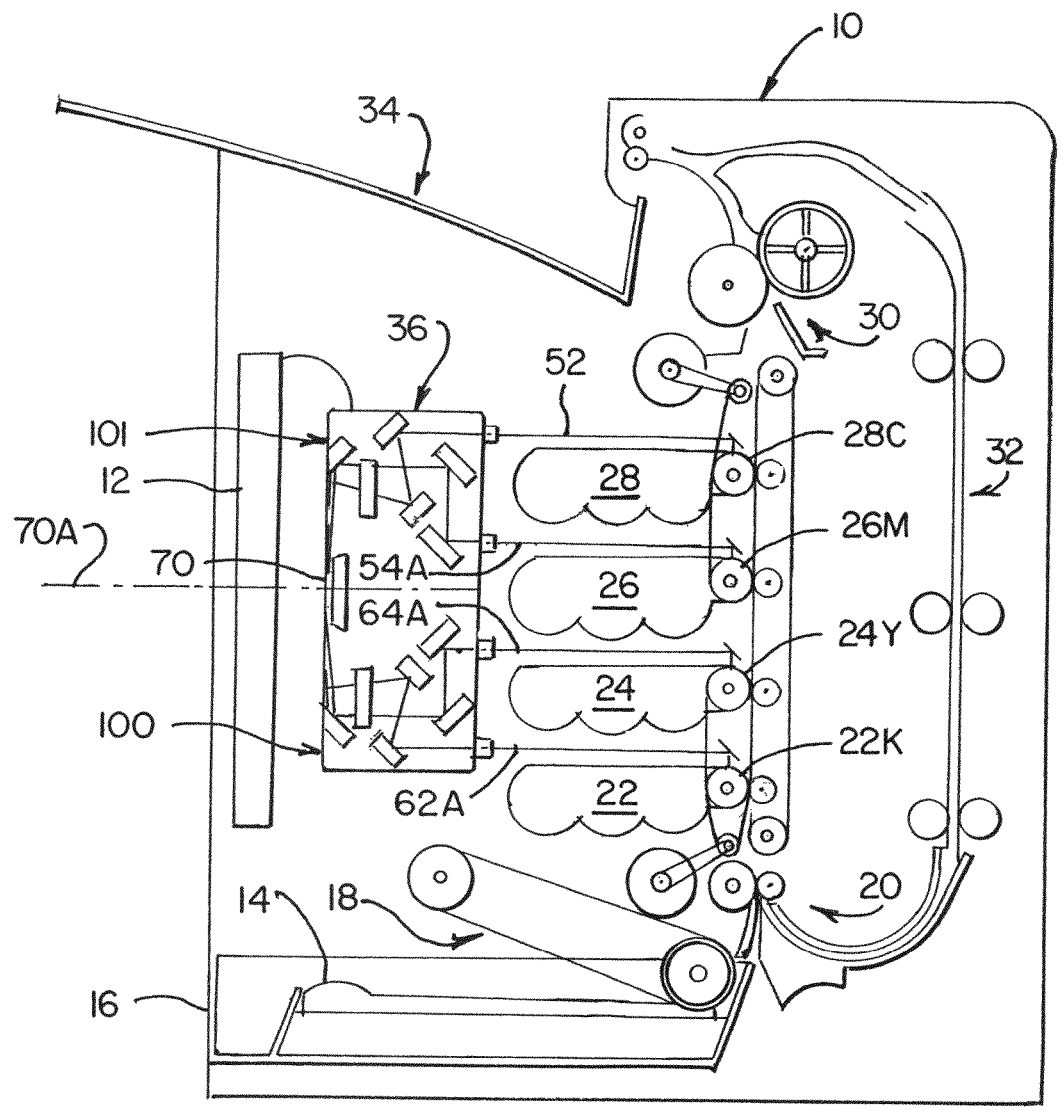
FIG. 1 is a schematic illustration of an electrophotographic image forming apparatus including a printhead constructed in accordance with the present invention.

FIG. 1 depicts a representative electrophotographic image forming apparatus, such as a color laser printer, which is indicated generally by the numeral 10. An image to be printed is electronically transmitted to a controller 12 by an external device (not shown). The controller 12 includes system memory, one or more processors, and other logic necessary to control the functions of electrophotographic imaging.

In performing a printing operation, the controller 12 initiates an imaging operation where a top sheet 14 of a stack of media is picked up from a media tray 16 by a pick mechanism 18 and is delivered to a media transport belt 20. The media transport belt 20 carries the sheet 14 past each of four image forming stations 22, 24, 26, 28, which apply toner to the sheet 14. The image forming station 22 includes a photoconductive drum 22K that delivers black toner to the sheet 14 in a pattern corresponding to a black image plane of the image being printed. The image forming station 24 includes a photoconductive drum 24Y that delivers yellow toner to the sheet 14 in a pattern corresponding to a yellow image plane of the image being printed. The image forming station 26 includes a photoconductive drum 26M that delivers magenta toner to the sheet 14 in a pattern corresponding to a magenta image plane of the image being printed. The image forming station 28 includes a photoconductive drum 28C that delivers cyan toner to the sheet 14 in a pattern corresponding to a cyan image plane of the image being printed.

The media transport belt 20 then carries the sheet 14 with the unfixed toner image superposed thereon to a fuser assembly 30, which applies heat and pressure to the sheet 14 so as to promote adhesion of the toner thereto. Upon exiting the fuser assembly 30, the sheet 14 is either fed into a duplexing path 32 for performing a duplex printing operation on a second surface of the sheet 14, or the sheet 14 is conveyed from the apparatus 10 to an output tray 34.

To effect the imaging operation, the controller 12 manipulates and converts data defining each of the CYMK image planes into separate corresponding laser pulse video signals, and the video signals are then communicated to a printhead 36 (also referred to herein as a "laser scanning unit"). The printhead 36 comprises a printhead housing 100, which comprises a base 110 and a cover 120, see FIGS. 2-4. The base 110 comprises a top section 112A, illustrated in FIG. 2, and a bottom section 112B, illustrated in FIG. 3. The cover 120 is received over and coupled to the base bottom section 112B. The cover 120 comprises a main body 121, see FIG. 4. In order to properly locate the cover 120 relative to the base 110, the cover main body 121 is formed with first and second tabs 121A and 121B, respectively. The first tabs 121A are received in corresponding first recesses 114A in the base 110 and the second tabs 121B are received in corresponding second recesses 114B in the base 110. The cover main body 121 further includes integral clips 121C having openings 121D therein for receiving tabs 116 formed on the base 110 so as to releasably connect the cover 120 to the base 110.

The printhead 36 further includes a single rotatable polygonal mirror 70 and a pre-scan optical assembly 40 comprising first and second pre-scan laser diode/lens assemblies 50 and 60. The pre-scan assemblies 50 and 60 are spaced apart from one another by an angle of approximately 120 degrees, see FIG. 2. The mirror 70 is supported for rotation about a rotational axis 70A, driven by an appropriate motor and comprises a plurality of facets 72, see FIGS. 1 and 2.

Figure 2:
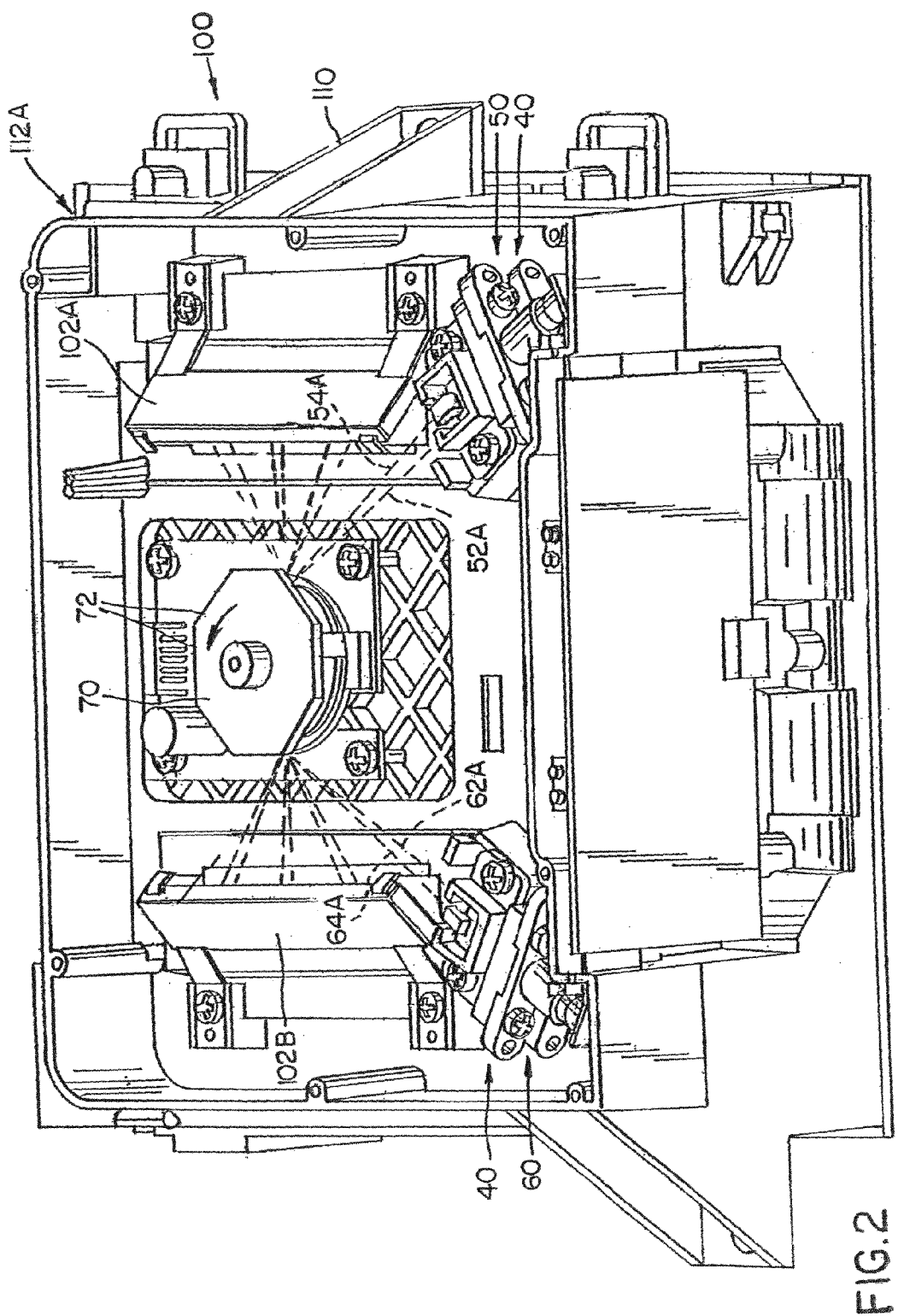
FIG. 2 is a perspective view of the printhead illustrating a polygonal mirror, first and second pre-scan assemblies and a top section of the printhead housing.
Figure 2A:
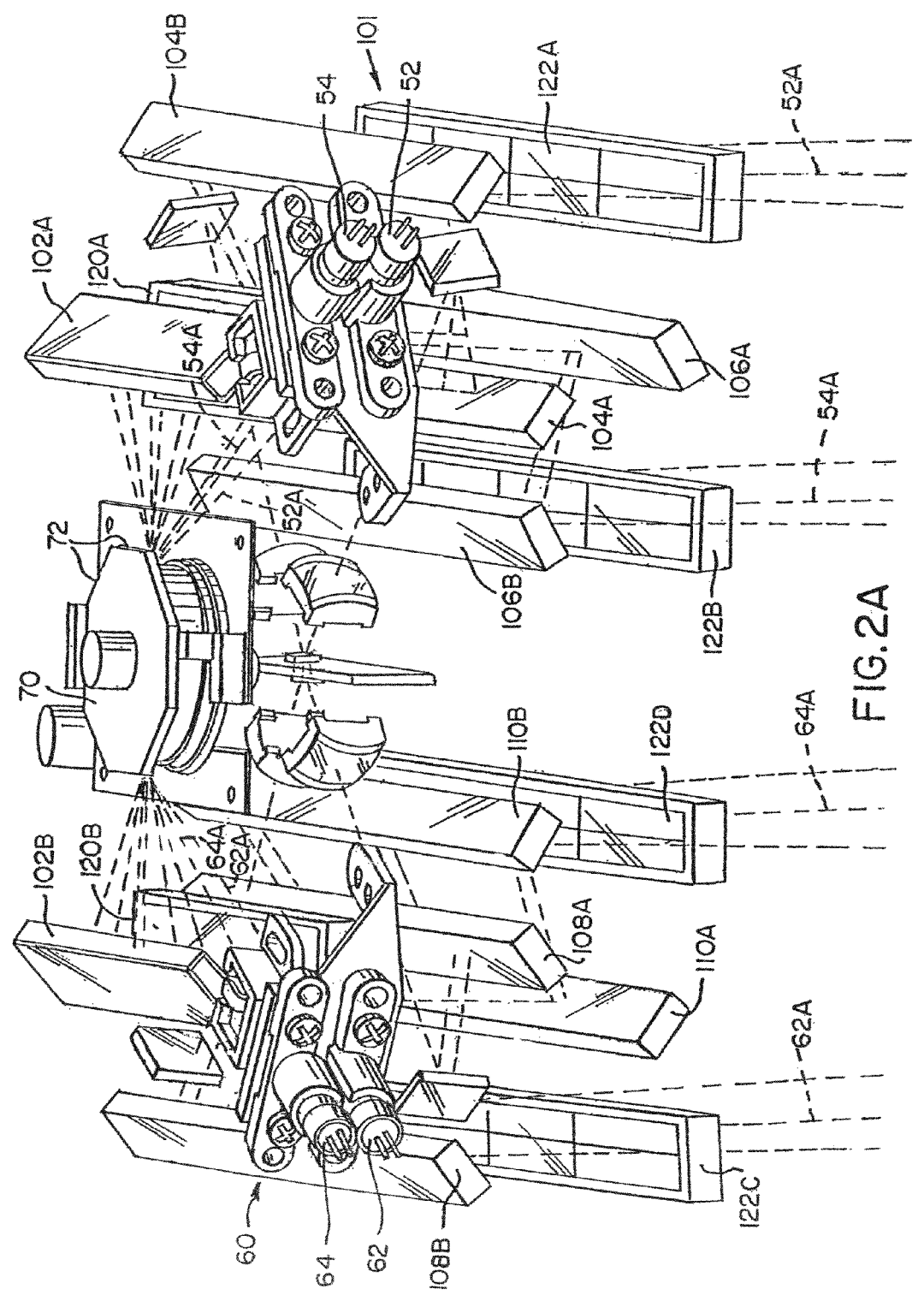

The first pre-scan assembly 50 comprises first and second laser diodes 52 and 54, each of which generates a corresponding laser beam 52A and 54A, see FIGS. 2 and 2A. The second pre-scan assembly 60 comprises third and fourth laser diodes 62 and 64, each which generates a corresponding laser beam 62A and 64A. The first and second pre-scan assemblies 50 and 60 may be constructed in the same manner as the first and second pre-scan assemblies disclosed in U.S. patent application Ser. No. 10/808,131, filed on Mar. 24, 2004, and entitled "LASER SCANNING UNIT HAVING A SENSOR FOR DETECTING BOTH START-OF-SCAN AND END-OF-SCAN POSITIONS OF A CORRESPONDING LASER BEAM," the disclosure of which is incorporated herein by reference.

Each of the laser beams 52A, 54A, 62A, 64A is modulated so as to write pixels or Pels according to an associated one of the video signals from the controller 12 as the beam scans along a corresponding scan path. In particular, the first laser beam 52A is modulated according to a video signal corresponding to the cyan image plane. The second laser beam 54A is modulated according to a video signal corresponding to the magenta image plane. The third laser beam 62A is modulated according to a video signal corresponding to the black image plane. The fourth laser beam 64A is modulated according to a video signal corresponding to the yellow image plane.

Figure 3:
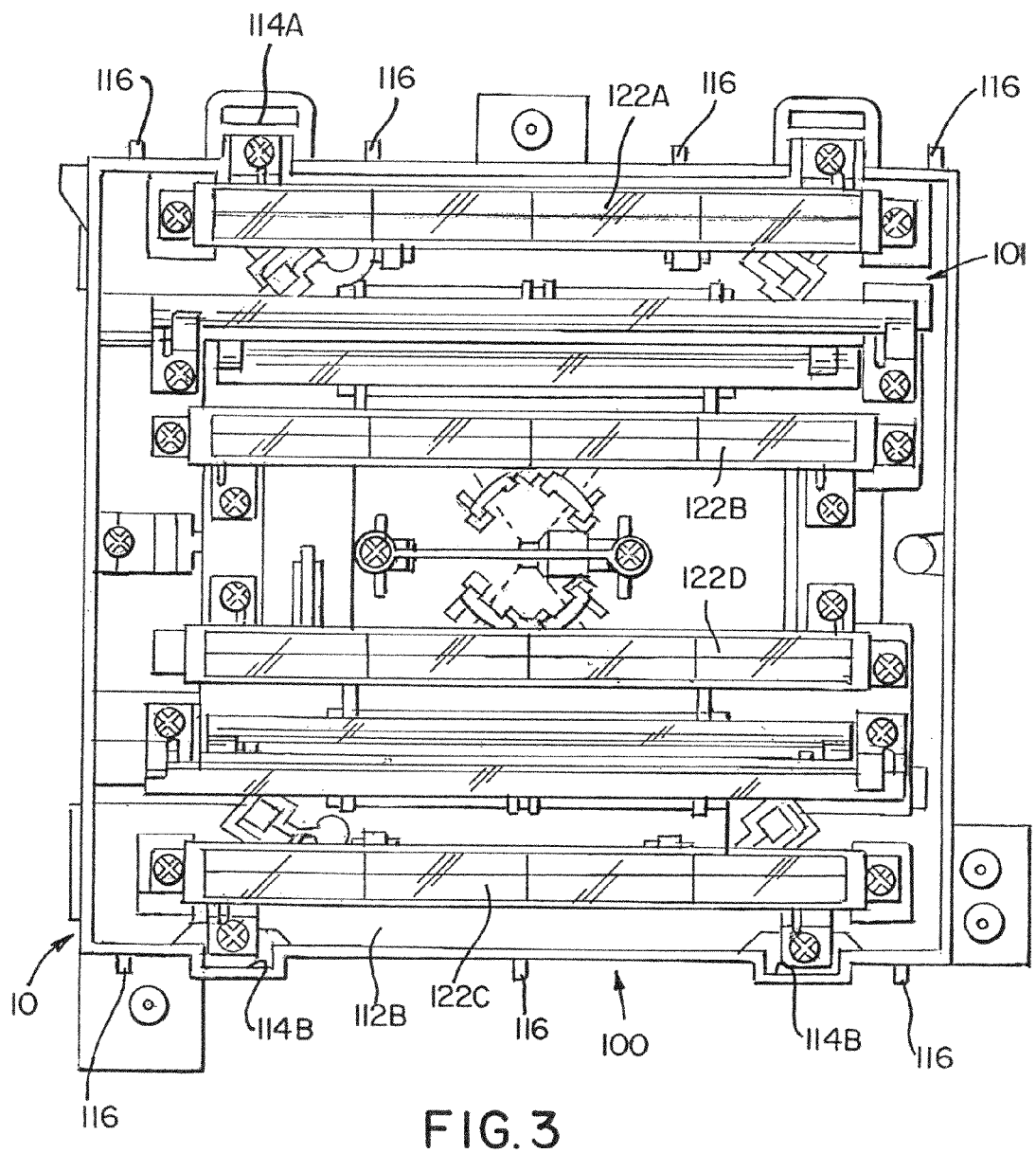
FIG. 3 is a view of the printhead illustrating the bottom section of the printhead housing.

Each laser beam 52A, 54A, 62A, 64A is reflected off the rotating polygonal mirror 70 and is directed towards a corresponding one of the photoconductive drums 28C, 26M, 22K, 24Y by select mirrors and lenses in a post-scan optical assembly 101, see FIGS. 2A and 3. The first and second beams 52A, 54A, after being reflected off the rotating polygonal mirror 70, are reflected by a reflection mirror 102A and pass through a first F-1 lens 120A, see FIG. 2A. After passing through the first F-1 lens 120A, the first beam 52A is reflected by first beam mirrors 104A and 104B prior to passing through a corresponding first F-2 lens 122A, see FIGS. 2A and 3. The second beam 54A, after passing through the first F-1 lens 120A, is reflected by second beam mirrors 106A and 106B prior to passing through a corresponding second F-2 lens 122B. The rotation of the polygonal mirror 70 and positioning of the mirrors 102A, 104A, 104B, 106A, 106B and lenses 120A, 122A, 122B of the post-scan optical assembly 101 causes each laser beam 52A, 54A to repeatedly sweep, along a corresponding scan path in the scan direction, across its corresponding photoconductive drum 28C, 26M so as to write Pels to form a latent image on the drum.

After being reflected by the mirror 70, the third and fourth beams 62A and 64A are reflected by a reflection mirror 102B and pass through a second F-1 lens 120B, see FIG. 2A. After passing through the second F-1 lens 120B, the third beam 62A is reflected by third beam mirrors 108A and 108B prior to passing through a corresponding third F-2 lens 122C. The fourth beam 64A, after passing through the second F-1 lens 120B, is reflected by fourth beam mirrors 110A and 110B prior to passing through a corresponding fourth F-2 lens 122D. The rotation of the polygonal mirror 70 and positioning of the mirrors 102B, 108A, 108B, 110A, 110B and lenses 120B, 122C, 122D of the post-scan optical assembly 101 causes each laser beam 62A, 64A to repeatedly sweep, along a corresponding scan path in the scan direction, across its corresponding photoconductive drum 22K, 24Y so as to write Pels to form a latent image thereon.

The post-scan optical assembly 101 may be constructed in the same manner as the post-scan optical assembly disclosed in U.S. patent application Ser. No. 10/808,131, filed on Mar. 24, 2004, and entitled "LASER SCANNING UNIT HAVING A SENSOR FOR DETECTING BOTH START-OF-SCAN AND END-OF-SCAN POSITIONS OF A CORRESPONDING LASER BEAM," previously incorporated herein by reference.

Figure 4:
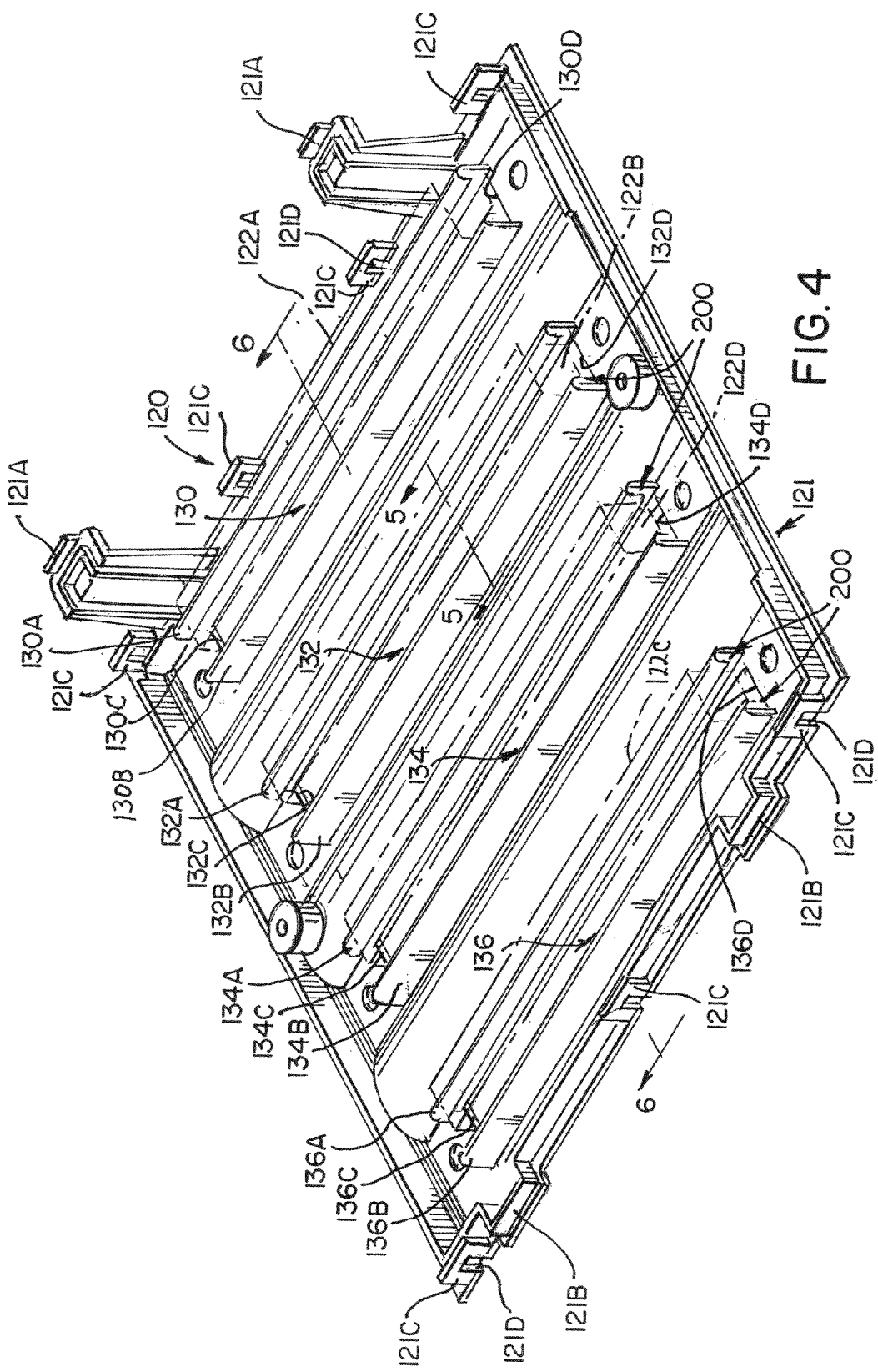
FIG. 4 is a perspective view of a cover of the printhead housing.
Figure 6:
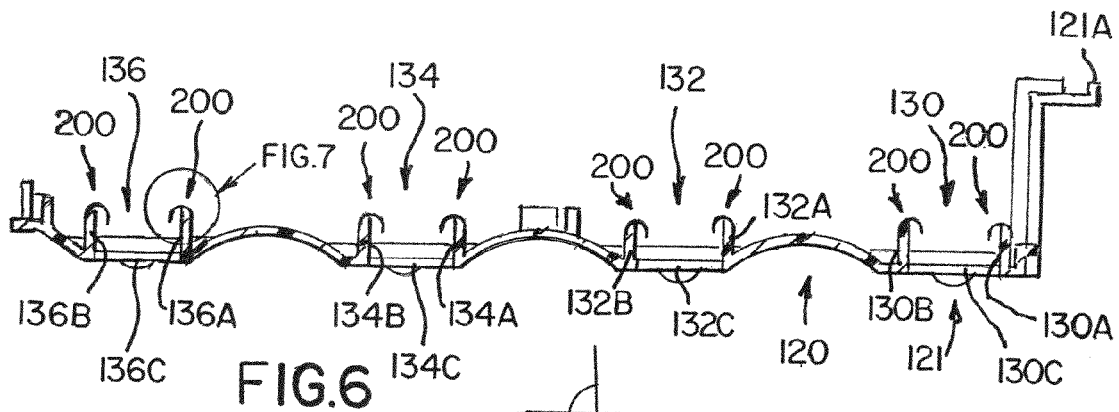
FIG. 6 is a cross-sectional view taken along view line 6-6 in FIG. 4.

Referring to FIGS. 4 and 6, the cover main body 121 comprises first and second longitudinal walls 130A and 130B and first and second end walls 130C and 130D defining a first opening 130; third and fourth longitudinal walls 132A and 132B and third and fourth end walls 132C and 132D defining a second opening 132; fifth and sixth longitudinal walls 134A and 134B and fifth and sixth end walls 134C and 134D defining a third opening 134; and seventh and eighth longitudinal walls 136A and 136B and seventh and eighth end walls 136C and 136D defining a fourth opening 136. When the cover 120 is coupled to the base 110, each of the openings 130, 132, 134 and 136 is in general alignment with a corresponding one of the F-2 lenses 122A, 122B, 122D and 122C so as to allow the first, second, fourth and third beams 52A, 54A, 64A and 62A to exit the housing 100 after passing through the F-2 lenses 122A, 122B, 122D and 122C, see FIG. 4.

Figure 5:
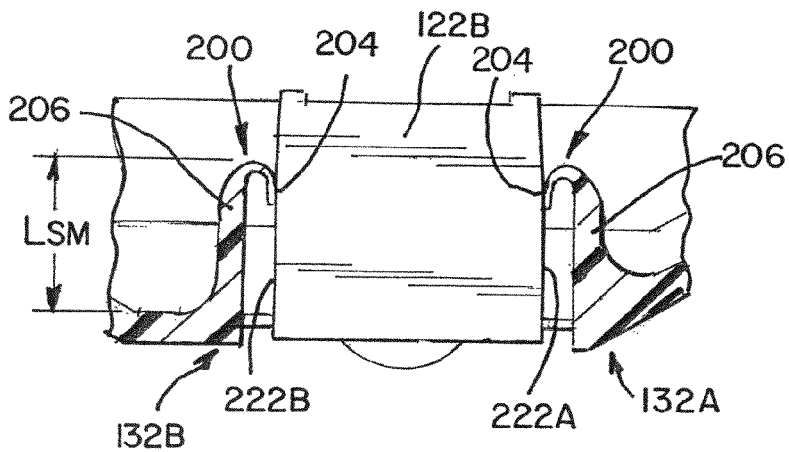
FIG. 5 is a cross-sectional view taken along view line 5-5 in FIG. 4.

It is desirable to minimize the amount of dust and like contamination from entering the housing 100 so as to prevent dust and the like from reaching and, possibly, adhering to the rotatable polygonal mirror 70. Dust and like contamination on the mirror 70 may cause print defects. In this regard, each of the cover longitudinal side walls 130A, 130B, 132A, 132B, 134A, 134B, 136A, 136B comprises a longitudinal seal structure 200 to engage an adjacent longitudinal side portion or wall of a corresponding F-2 lens. The seal structure 200 forms a seal between the lens longitudinal side portion and the cover longitudinal side wall 130A, 130B, 132A, 132B, 134A, 134B, 136A, 136B to prevent air and dust from passing through a gap between the lens side portion and the cover longitudinal side wall. In FIG. 5, the seal structures 200 for longitudinal side walls 132A and 132B are shown engaged with longitudinal side portions 222A and 222B of the second F-2 lens 122B.

Figure 7:
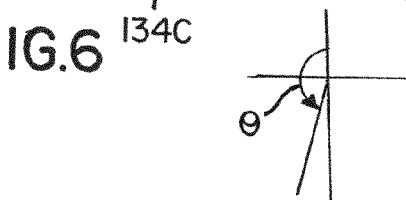
FIG. 7 is an enlarged cross sectional view of a portion of a seal structure of the cover illustrated in FIG. 4.
Figure 7:
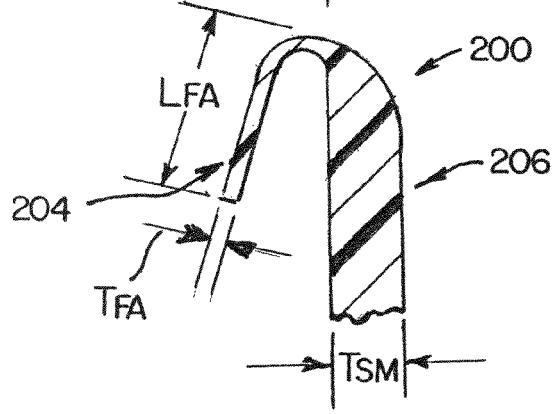

The longitudinal seal structure 200 for each longitudinal side wall 130A, 130B, 132A, 132B, 134A, 134B, 136A, 136B comprises a flexible arm 204. Each flexible arm 204 is integral with an adjacent portion or support member 206 of its corresponding longitudinal side wall 130A, 130B, 132A, 132B, 134A, 134B, 136A, 136B, see FIGS. 5 and 6. In the illustrated embodiment, the support member 206 has a length $L_{SM}$ of from about 5 mm to about 20 mm and a thickness $T_{SM}$ of from about 1 mm to about 3 mm, see FIGS. 5 and 7. The flexible arm 204 has a length $L_{FA}$ of from about 3 mm to about 20 mm and a thickness $T_{FA}$ of from about 0.1 mm to about 1 mm. The flexible arm 204 may extend relative to the support member 206 at an angle theta of from about 95 degrees to about 175 degrees and preferably about 135 degrees, see FIG. 7.

When the cover 120 is assembled to the base 110, the flexible arms 204 flex to allow a corresponding F-2 lens 122A, 122B, 122D and 122C to be received between a pair of the longitudinal side walls 130A, 130B, 132A, 132B, 134A, 134B, 136A, 136B. The thickness $T_{FA}$, length $L_{FA}$ and angle theta of each flexible arm 204 are chosen so as to allow the flexible arms 204 to flex and receive a corresponding F-2 lens without requiring an operator to apply excessive force when assembling the cover 120 to the base 110 yet still allow each seal structure 200 to create an adequate seal to prevent dust and the like from passing between the gap between a cover longitudinal side wall and a lens side portion.

So as to allow the flexible arms 204 to be formed with a narrow thickness $T_{FA}$, the cover main body 121 may be formed from a microcellular foam using a process developed by Trexel Inc. and commercialized under the Trademark MuCell®. Materials from which the cover main body 121 may be formed include an engineering resin such as a blend of polycarbonate alloy plus acrylonitrile butadiene styrene.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cover adapted to form part of a housing of a laser scanning unit comprising:
 a main body having walls for defining at least one opening adjacent a lens located in a base of a laser scanning unit housing, at least one of said walls comprising a seal structure formed integral with an adjacent portion of said at least one wall, said seal structure engaging a side portion of said lens so as to seal a gap between said lens side portion and said at least one wall;
 wherein said adjacent portion of said at least one wall comprises a support member and said seal structure comprises a flexible arm extending from said support member.

2. A cover as set out in claim 1, wherein said flexible arm extends from said support member at an angle of from about 95 degrees to about 175 degrees.

3. A cover as set out in claim 1, wherein said flexible arm has a thickness of from 0.1 mm to about 1 mm.

4. A cover as set out in claim 3, wherein said support member has a thickness of from about 1 mm to about 3 mm.

5. A cover as set out in claim 1, wherein said at least one main body wall comprises at least one longitudinal wall and said seal structure comprises a longitudinal seal structure engaging a longitudinal side portion of said lens.

6. A cover as set out in claim 1, wherein said at least one main body wall comprises first and second longitudinal main body walls, said first wall defining a first seal structure engaging a first longitudinal side portion of said lens and said second wall defining a second seal structure engaging a second longitudinal side portion of said lens.

7. A cover as set out in claim 1, wherein said main body walls define first and second openings, said first opening receiving a first lens and defined in part by a first wall and said second opening receiving a second lens and defined in part by a second wall, said first wall comprising a first seal structure formed integral with an adjacent portion of said first wall for engaging a side portion of said first lens so as to seal a gap between said first lens side portion and said first wall and said second wall comprising a second seal structure formed integral with an adjacent portion of said second wall for engaging a side portion of said second lens so as to seal a gap between said second lens side portion and said second wall.

8. A cover as set out in claim 1, wherein said main body is formed from a microcellular foam.

9. A housing for a laser scanning unit comprising:
 a base; and
 a cover adapted to be secured to said base, said cover comprising a main body having walls for defining at least one opening adjacent to a lens located in said base, at least one of said walls comprising seal structure formed integral with an adjacent portion of said one wall, said seal structure being adapted to engage a side portion of said lens so as to seal a gap between said lens side portion and said one wall;
 wherein said adjacent portion of said one wall comprises a support member and said seal structure comprises a flexible arm extending from said support member.

10. A housing as set out in claim 9, wherein said flexible arm extends from said support member at an angle of from about 95 degrees to about 175 degrees.

11. A housing as set out in claim 9, wherein said flexible arm has a thickness of from about 0.1 mm to about 1 mm.

12. A housing as set out in claim 11, wherein said support member has a thickness of from about 1 mm to about 3 mm.

13. A housing as set out in claim 9, wherein said at least one main body wall comprises at least one longitudinal wall and said seal structure comprises a longitudinal seal structure engaging a longitudinal side portion of said lens.

14. A housing as set out in claim 9, wherein said at least one main body wall comprises first and second longitudinal walls, said first wall defining a first seal structure engaging a first longitudinal side portion of said lens and said second wall defining a second seal structure engaging a second longitudinal side portion of said lens.

15. A housing as set out in claim 9, wherein said main body walls define first and second openings, said first opening for receiving a first lens and defined in part by a first wall and said second opening for receiving a second lens and defined in part by a second wall, said first wall comprising a first seal structure formed integral with an adjacent portion of said first wall for receiving a side portion of said first lens so as to seal a gap between said first lens side portion and said first wall and said second wall comprising a second seal structure formed integral with an adjacent portion of said second wall for engaging a side portion of said second lens so as to seal a gap between said second lens side portion and said second wall.

16. A housing as set out in claim 9, wherein said main body is formed from a microcellular foam.

* * * * *